United States Patent [19]

McKeen

[11] Patent Number: 5,562,846

[45] Date of Patent: Oct. 8, 1996

[54] METHOD OF MAKING A MOLD PART HAVING A COOLING PASSAGE

[75] Inventor: W. John McKeen, Ottawa, Canada

[73] Assignee: Northern Telecom Limited, Montreal, Canada

[21] Appl. No.: 299,389

[22] Filed: Sep. 1, 1994

[51] Int. Cl.[6] .................. B29C 33/40; B29C 35/08; B29C 41/02

[52] U.S. Cl. ................ 249/79; 249/80; 264/219; 264/308; 264/401

[58] Field of Search ............ 249/79, 80; 264/22, 264/219, 308, 401

[56] References Cited

U.S. PATENT DOCUMENTS

| | | | |
|---|---|---|---|
| 5,198,159 | 3/1993 | Nakamura et al. | 264/22 |
| 5,263,130 | 11/1993 | Pomerantz et al. | 264/22 |
| 5,348,693 | 9/1994 | Taylor et al. | 264/22 |
| 5,387,380 | 2/1995 | Cima et al. | 264/308 |
| 5,415,820 | 5/1995 | Furuta et al. | 264/22 |
| 5,439,622 | 8/1995 | Pennisi et al. | 264/219 |
| 5,460,758 | 10/1995 | Langer et al. | 264/401 |

FOREIGN PATENT DOCUMENTS

| | | | |
|---|---|---|---|
| 2-147210 | 6/1990 | Japan | 264/219 |
| 754139 | 8/1980 | U.S.S.R. | 264/22 |

*Primary Examiner*—Robert Davis
*Attorney, Agent, or Firm*—R. J. Austin

[57] ABSTRACT

Making a mold part by a growth process in which polymerizable plastic material is converted into polymerized plastic material at selected regions and, during the growth process, cooling passages are formed. The growth process is provided by polymerizing succeeding layers of plastic material, adjacent layers being bonded together. Also provided is a mold part made by the growth process.

3 Claims, 2 Drawing Sheets

METHOD OF MAKING A MOLD PART HAVING A COOLING PASSAGE

FIELD OF THE INVENTION

This invention relates to methods of making mold parts having cooling passages.

BACKGROUND OF THE INVENTION

Conventionally, mold parts are made by machining and/or die casting metals. In this manufacture, where cooling passages are required, these may be formed by machining the passages through the parts. Alternatively, when the cooling passages are of complex form and shape, tubular heat exchange members are disposed in specific locations within the mold parts. This is achieved by disposing the tubular heat exchange members in specific positions and then die casting the mold parts around them. These procedures are extremely expensive; time consuming and labor intensive. They involve the intricate design of the mold parts, use of expensive metal cutting machinery for removal of unrequired metal and/or the design and manufacture of special die casting tools to perform the die casting operations required. Mold parts, because of their expense, are intended to have a long working life and their useful working life does in many cases far exceed their required working life. The expense directly reflects upon the production cost and sale price of the articles which are to be molded by the mold parts and much profit must be lost where only a portion of the useful working life of a mold part is actually required as when, for instance, manufacture of the molded articles is discontinued for any reason.

Apart from the expense, because of restrictions of manufacture, i.e. drilling or use of tubular members for the cooling passages, it is sometimes extremely difficult or even impossible to dispose these passages in most desirable locations within a mold in order to achieve the most efficient mold cooling. This may result in undesirable hot spots in a mold which will need design modifications to overcome or degradation in the molded plastic of the molded product may result.

SUMMARY OF THE INVENTION

The present invention seeks to provide a method of making a mold part and also a mold part which minimizes the above problems while significantly reducing manufacturing expense.

According to one aspect of the present invention there is provided a method of making a mold part comprising growing the mold part by the conversion of polymerizable plastic material into polymerized plastic material selectively in desirable regions so as to produce a body of the mold part and a mold surface defined by the body, and simultaneously during growing of the body defining at least one cooling passage extending through the body.

The growing process, in practice, is performed by the stereolithographic process. In this process there is a step-by-step growing of the body by polymerization of successive layers of a photocurable polymer by the use of laser light. The stereolithographic process involves the use of a laser controllably moving in horizontal planes above a vat of the liquid photocurable polymer. The laser is passed over the vat by computer control while being directed at the surface of the polymer. The mold part so far produced is built-up by polymerization of successive layers of plastic in which the already formed portion of the mold part is submerged at a controlled level below the surface of the unpolymerized polymer, the thickness of the non-polymerized polymer above the already formed mold part then being polymerized in the selected desirable regions to form a next successive layer. After the formation of each layer, the already formed mold part is moved downwards by a controlled amount to provide another controlled depth of unpolymerized material above it and this controlled depth of material is polymerized in selected regions by the next passing operation of the laser. The photocurable polymer may be any which is suitable such as acrylic or epoxy resins.

By the use of the process, the mold part may be produced in any desired and perhaps intricate shape while the cooling passage is locatable in any position where it is required for the best cooling performance in the mold. The mold part therefore is not restricted in the position of the cooling passage as is normally the case with conventional mold part structures, i.e. by the limitations imposed by the use of cooling tubes or machining to cut the cooling passage into the mold part. Further, the cost of a mold part made by the above process is incredibly small compared to the cost of a conventional metal mold. While such a mold part may have a short commercial life for molding plastic articles, a succession of replacement mold parts may be made quickly and cheaply and expenditure on replacement mold parts may cease immediately production of the molded articles is terminated. Minimization of expenditure is thus obtained while the convenience in mold part manufacture is maximized.

The invention also includes a mold part comprising a body having a cooling passage extending therethrough, the body also defining a mold surface and formed by a growth process by the conversion of polymerizable plastic material selectively in desirable regions into polymerized material with cooling passage formed simultaneously during growing of the body.

DESCRIPTION OF DRAWINGS

One embodiment of the invention will now be described, by way of example, with reference to the accompanying drawings, in which:-

DETAILED DESCRIPTION OF AN EMBODIMENT

Figure 1:
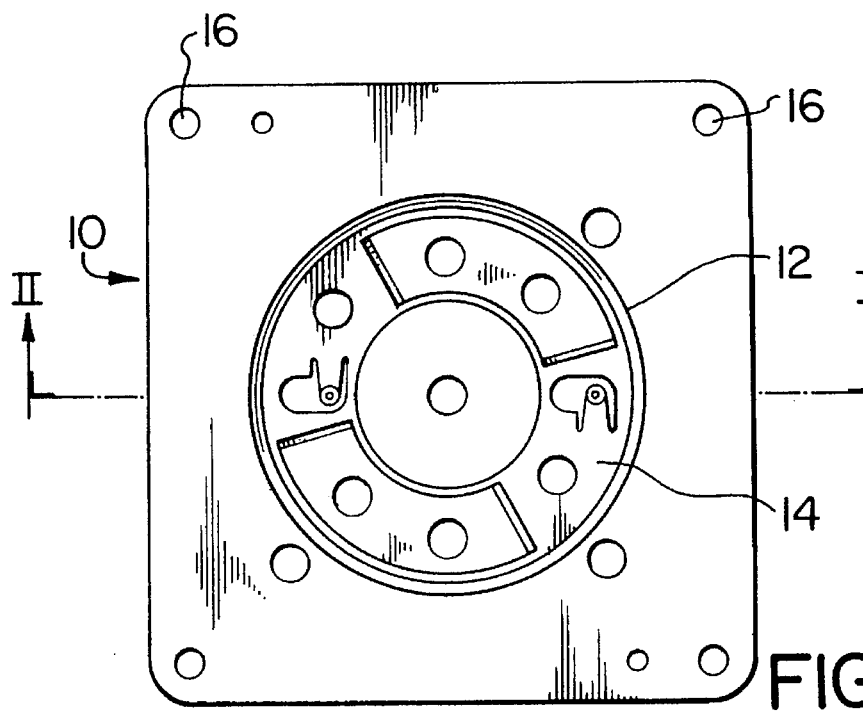
FIG. 1 is a plan view of a mold part according to the embodiment.
Figure 2:
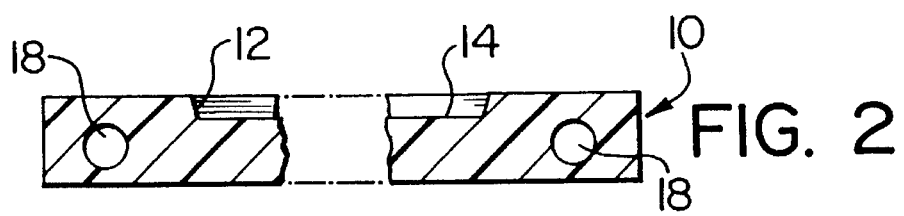
FIG. 2 is a cross-sectional view through the mold part taken along line II—II in FIG. 1.
Figure 3:
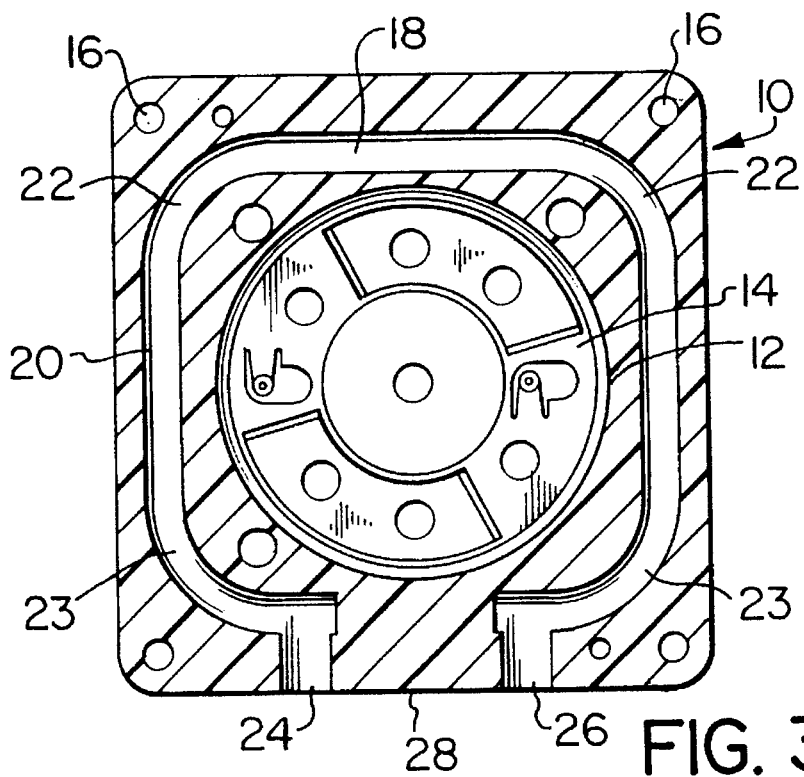
FIG. 3 is a plan view of the cross-sectioned mold part taken in the direction of arrow III in FIG. 2.

As shown in FIGS. 1, 2 and 3 a mold part 10 comprises a body made from a polymerized acrylic or epoxy resin. It has a mold surface comprising a cylindrical surface part 12 which is slightly tapered for withdrawal purposes of the molded article and a base surface part 14. The mold part is formed with circular bores 16 located in various places for the purpose of locating or holding pins when the mold part is assembled into a molding apparatus. A cooling passage 18 extends around the mold part, the cooling passage having three straight passage portions 20 connected in series by curved corner portions 22, and curved corner portions 23 of the passage joined with an inlet 24 and an outlet 26 disposed at one side 28 of the body. The cooling passage 18 is disposed in its most desirable location for efficient heat removal from the surface parts 12 and 14.

Figure 4:
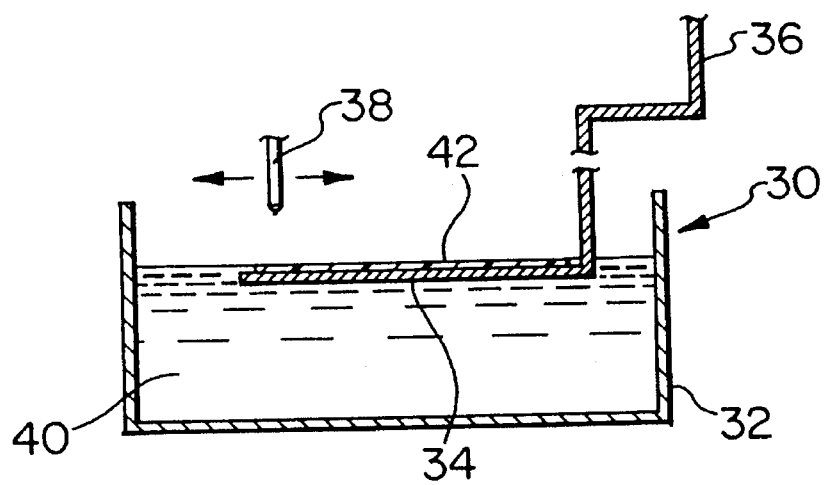
FIG. 4 is a cross-sectional view through a stereo lithography apparatus showing the mold part during formation.

The mold part 10 is manufactured by a stereolithographic process as advertised by "3D Systems Inc." of Valencia, Calif. As shown by FIG. 4, a stereolithographic apparatus 30 comprises a bath or vat 32 having a support platform 34 mounted within it, the support platform connected by a rigid support 36 to a drive (not shown) which is capable of moving the platform 34 vertically downwards in intermittent step-by-step fashion in controlled manner. Disposed above the bath 32 is a laser head 38 which is disposed to direct its light downwardly into the bath 32 as shown. To build the mold part 10 within the bath 32, the bath is filled to a desired position with non-polymerized plastic material 40 e.g. acrylic or epoxy resin for forming the mold part. At commencement of operations as shown by FIG. 4 the platform is disposed at its highest position within the bath with its support surface beneath and at a certain depth below the upper surface of the non-polymerized material 40 suitable for forming a first polymerized layer for the mold part 10 on the platform upon passage of the laser horizontally in computer controlled fashion in x and y directions above the bath.

The laser 38 is then controllably guided in its x and y directions horizontally over the top of the non-polymerized material 40 with the object of polymerizing the material in certain selected locations on a first pass of the laser beam. To effect polymerization in the desired areas, the laser traverses sufficiently quickly across regions of the bath where no polymerization is required at a fast speed to prevent polymerization. However, when disposed above the selected regions required for polymerization the laser movement is suitably slowed so that polymerization occurs. Hence, with the platform 34 disposed in its uppermost position, a first layer of polymerized acrylic or epoxy resin 42 is laid in position for forming the lowermost section of the mold part 10 as shown in FIG. 4. After the first layer 42 has been polymerized as required, the laser movement ceases and the platform 24 is moved downwards the required step so that the upper surface of the layer 42 is disposed a predetermined distance below the upper surface of the non-polymerized material 40 to enable a subsequent series of traverses of the laser 38 across the material 40 to provide a succeeding polymerized layer (not shown) upon the layer 42. The polymerization of the succeeding layer takes place in those desired regions where material of the mold part is required at the position of the succeeding layer.

Figure 5:
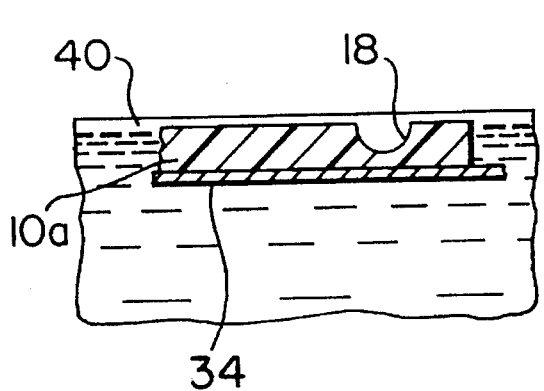
FIG. 5 is a cross-sectional view similar to FIG. 4 of part of the apparatus and to a larger scale, showing the mold part at one stage in its manufacture.
Figure 6:
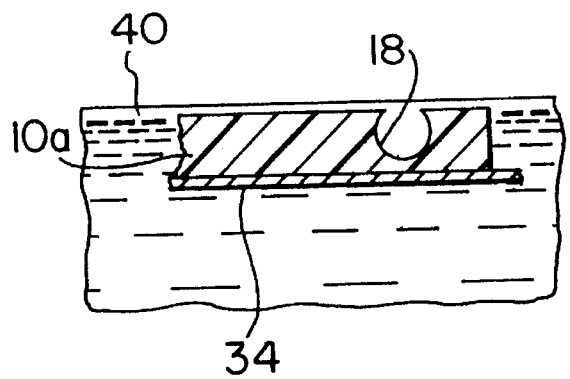
FIG. 6 is a view similar to FIG. 5 showing the mold part at a different stage in its manufacture.

Thus, as may be seen from FIGS. 5 and 6, the mold part 10 is grown in an upwards direction by succeeding layers of polymerized material which bond together during the process, and after each succeeding layer is formed the platform 34 is moved downwards appropriately to enable the next succeeding layer to be formed. FIG. 5 illustrates the molded article 10 at one stage of manufacture. At this stage, as may be seen for the partially formed mold part 10a, the passage 18 is substantially half completed around its circumference while the lower part is built-up. As shown in FIG. 6, the passage 18 at a further stage is almost completely closed by the deposition of polymerized resin upon the partially formed mold part 10a.

As may be seen from the above description, the method of growing the mold part 10 is completely suitable for the manufacture of mold parts themselves as distinct from manufacturing the mold parts in metal as is conventional. In the embodiment, which illustrates an important feature of the invention, the passage 18 is disposed in the most appropriate location for optimized cooling of the mold surfaces 12 and 14 and may, if required, be disposed in any other position which is determined to be suitable. The mold passage, as with the rest of the mold part, is created by the laser operation which is computer controlled so as to form the polymerized material in only the desired regions. As a result, the passage 18 together with the bores 16 are only located in the required positions which is dictated by the program which has been selected.

The above process for manufacture of the mold part 10 may be performed within a few hours. From commencement of the program controlled apparatus the growth of the mold part continues without any operating personnel being required in attendance. It is possible, therefore, to produce the mold part overnight and in preparation for use the following day for molding articles within a mold which includes the mold part 10. The mold part or any other mold part formed by the stereolithographic process is essentially cheap to manufacture. In the case of the mold part 10 the cost is minute cost compared to the cost of making a metal mold part similar to mold part 10. While the mold part 10 may only have a very short useful life, perhaps six or seven days, its small cost enables succeeding mold parts 10 to be made on a regular basis for replacement purposes. It has been found that for the manufacturing life of many molded plastic articles, that the total cost of making a plurality of mold parts 10 is essentially small compared to the cost of a single conventional metal mold part for the same purpose. In addition to this, there is provided a mold part which in having its cooling passage 18 in the most optimized position for cooling of the mold cavity, enables molded articles to be produced while minimizing the chances of the molded plastic in the article being degraded during the molding procedure. This therefore overcomes or largely avoids a problem with the manufacture of molded articles made by metal mold parts.

What is claimed is:

1. A method of making a mold part comprising growing the mold part by the conversion of polymerizable plastic material into polymerized plastic material selectively in desirable regions so as to produce a body of the mold part and a mold surface defined by the body, and simultaneously during growing of the body, defining at least one cooling passage extending through the body, the cooling passage having an entry at one end of the passage and on exit at the other end of the passage.

2. A method according to claim 1 comprising growing the mold part by polymerizing succeeding layers of plastic material in series one upon another with adjacent layers bonded together, the cooling passage defined step-by-step by a plurality of the succeeding layers each of which provides its own surface portions of the cooling passage.

3. A mold part comprising a body having a cooling passage extending therethrough, the body also defining a mold surface and formed by a growth process by the conversion of polymerizable plastic material selectively in desirable regions into polymerized plastic material with the cooling passage formed simultaneously during growing of the body, the cooling passage having an entry at one end of the passage and an exit at the other end of the passage.

\* \* \* \* \*